Figure 1:
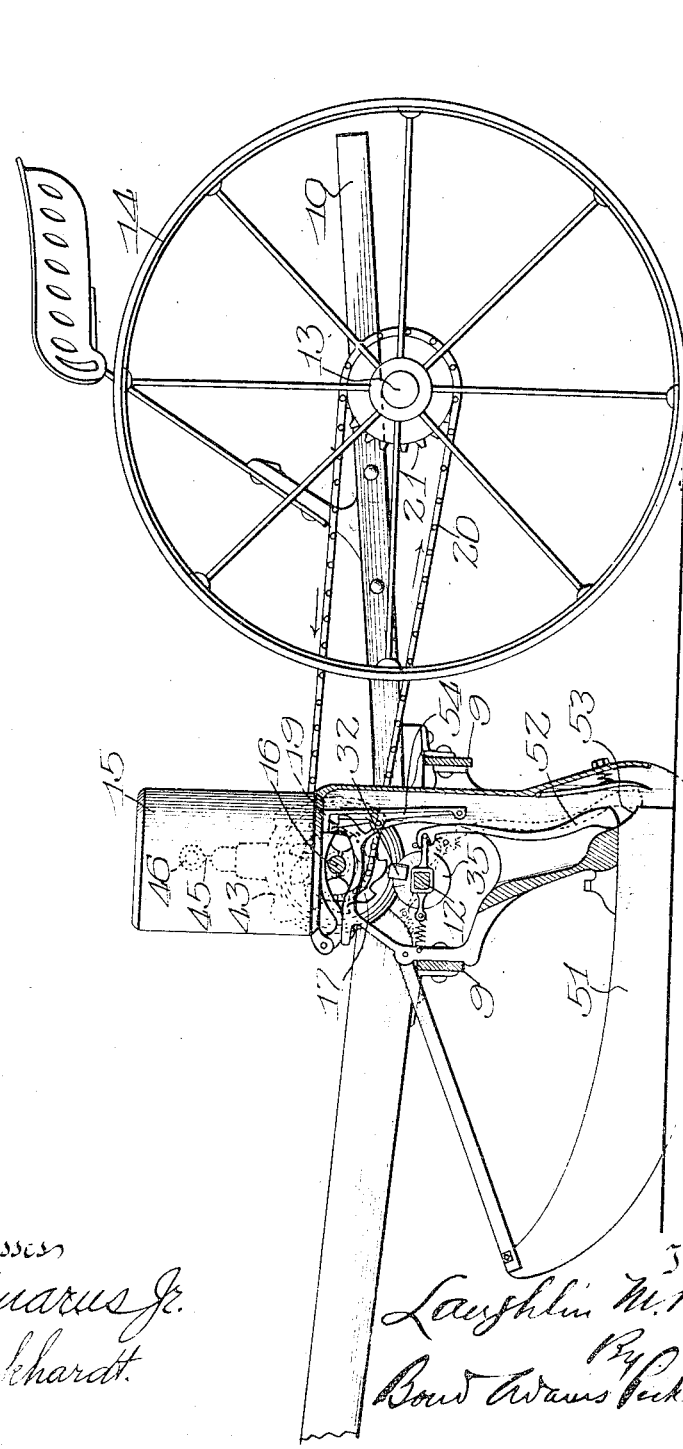

L. M. BUCHANAN.
CLUTCH FOR CORN PLANTERS.
APPLICATION FILED DEC. 26, 1911.

1,033,869.

Patented July 30, 1912.
4 SHEETS—SHEET 2.

L. M. BUCHANAN.
CLUTCH FOR CORN PLANTERS.
APPLICATION FILED DEC. 26, 1911.

1,033,869.

Patented July 30, 1912.

4 SHEETS—SHEET 3.

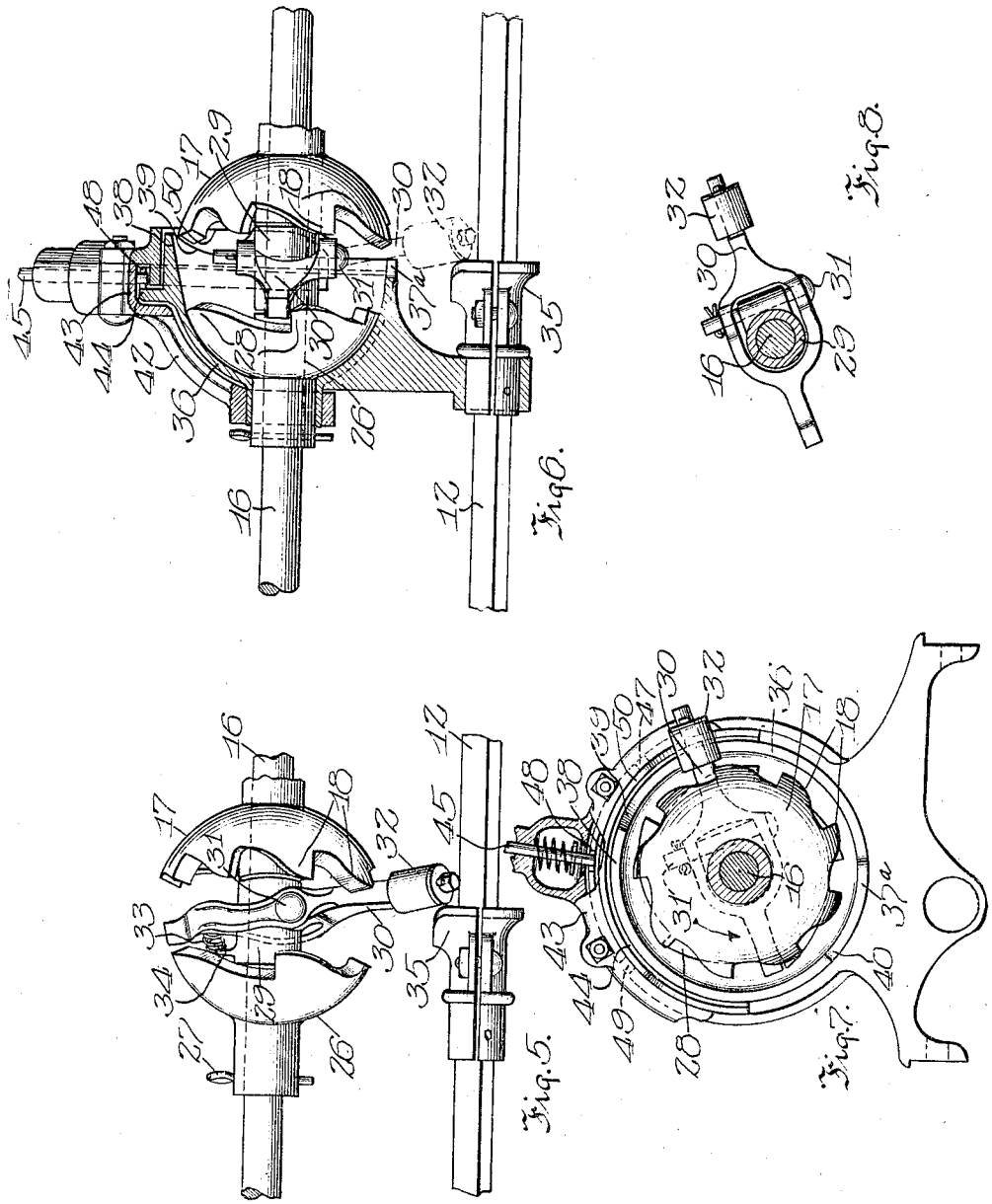

UNITED STATES PATENT OFFICE.

LAUGHLIN M. BUCHANAN, OF KEWANEE, ILLINOIS.

CLUTCH FOR CORN-PLANTERS.

1,033,869.  Specification of Letters Patent.  Patented July 30, 1912.

Application filed December 26, 1911.  Serial No. 667,882.

*To all whom it may concern:*

Be it known that I, LAUGHLIN M. BUCHANAN, a citizen of the United States, residing at Kewanee, in the county of Henry and State of Illinois, have invented certain new and useful Improvements in Clutches for Corn-Planters, of which the following is a specification, reference being had to the accompanying drawings.
My invention relates to improved clutch mechanism particularly adapted for corn planters by means of which the seed-plate of the planter may be given a predetermined amount of rotation at each operation of the check-rower mechanism.

More particularly still my invention relates to a new and improved clutch mechanism by which the predetermined amount of the rotation of the seed-plate may be varied so as to vary the number of grains dropped in each hill according to the nature and requirements of the soil.

One of the main features of my invention lies in the fact that the two clutch members are not immediately engaged by the operation of the check-rower devices.

My device is of such a character that it contains a mechanism intermediate the two clutch members in the form of a lever shaped dog, which, upon the operation of the check-row mechanism, is first caused to engage the continuously moving clutch member so as to be rotated therewith and thereupon, after it has got started to rotate with the continuously rotating clutch member, the intermediate member is caused to engage the other clutch member which is fixed on the seed-shaft so as to rotate the second clutch member and with it the seed-shaft and seed-plate. Means are provided also by which the point at which the intermediate member engages the clutch member fixed on the seed-shaft may be varied so as to vary the amount of rotation given to said second clutch member, and consequently to the seed-shaft and seed-plate. One great advantage in this form of construction lies in the fact that the load is not immediately thrown upon the clutch members at the instant of the operation of the clutch-rower mechanism, but the engaging intermediate member is first set in motion before it engages the second clutch member thereby saving great wear and frequent breaking of the teeth. To that end my device, generally speaking, comprises a shaft, a clutch member loosely mounted on said seed-shaft and adapted to be continuously driven by suitable means as by the carrying wheels of the planter, a second clutch member fixed to the shaft, an intermediate member or lever-dog loosely mounted on the shaft and normally yieldingly held out of engagement with either clutch member but adapted by each movement of the check-rower mechanism to be moved into engagement with the loose clutch member, and a cam-like device which is adapted to engage the intermediate member after it has engaged the loose clutch member and move the intermediate member into engagement with the fixed clutch member. The device is also, of course, adapted to automatically restore the intermediate member to a normal position at the end of a predetermined rotation. The device also, like all clutches of this description, is adapted to complete its operation in less time than the time elapsing between successive operations of the check-rower mechanism so as to make proper allowance for slippage of the wheels and irregularities of the ground and insure the predetermined amount of rotation of the seed-plate well within the space between the rows. I accomplish this object by the means shown in the drawings and hereinafter specifically described. That which I believe to be new will be set forth in the claims.

Figure 2:
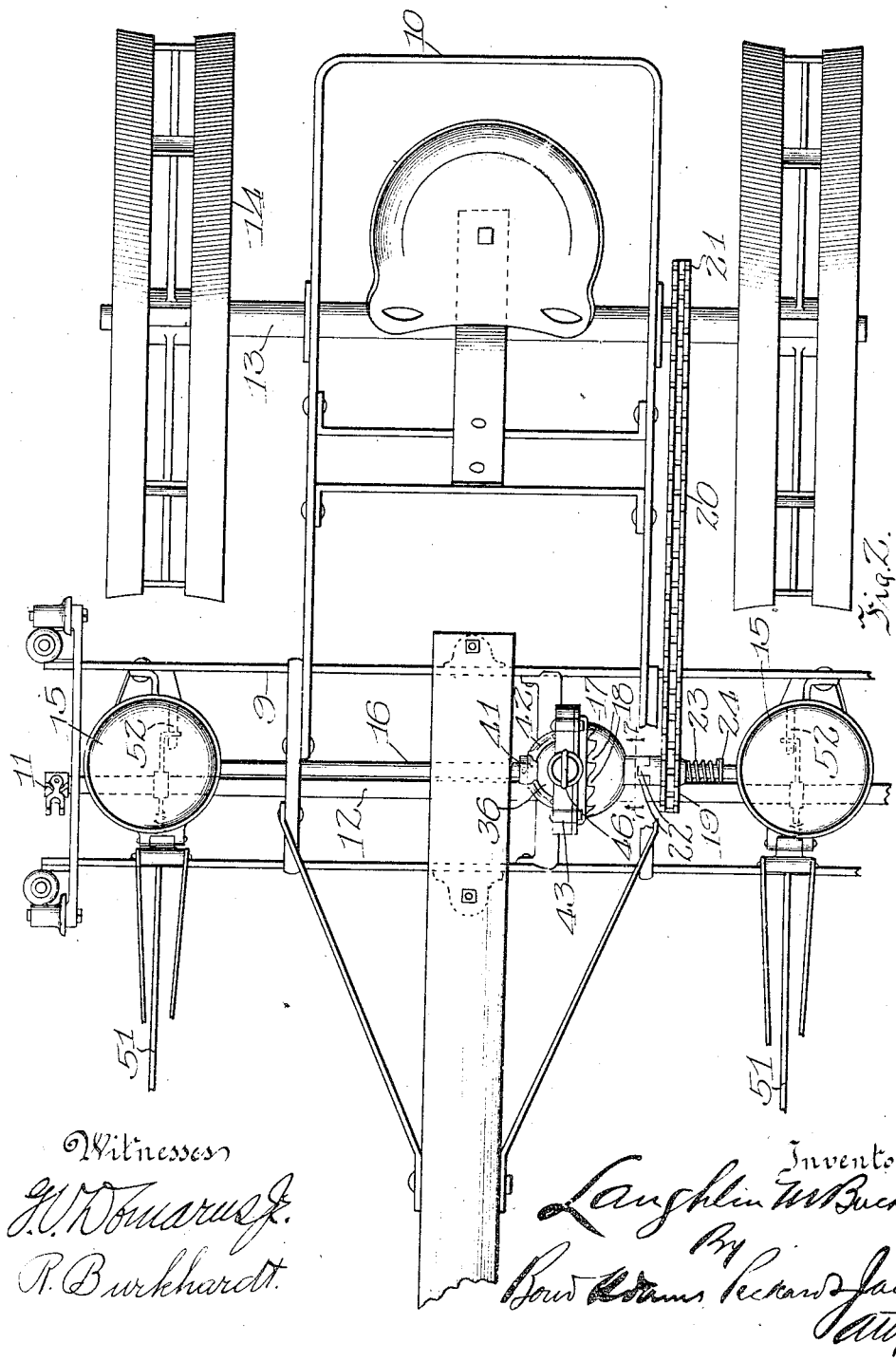
Figure 3:
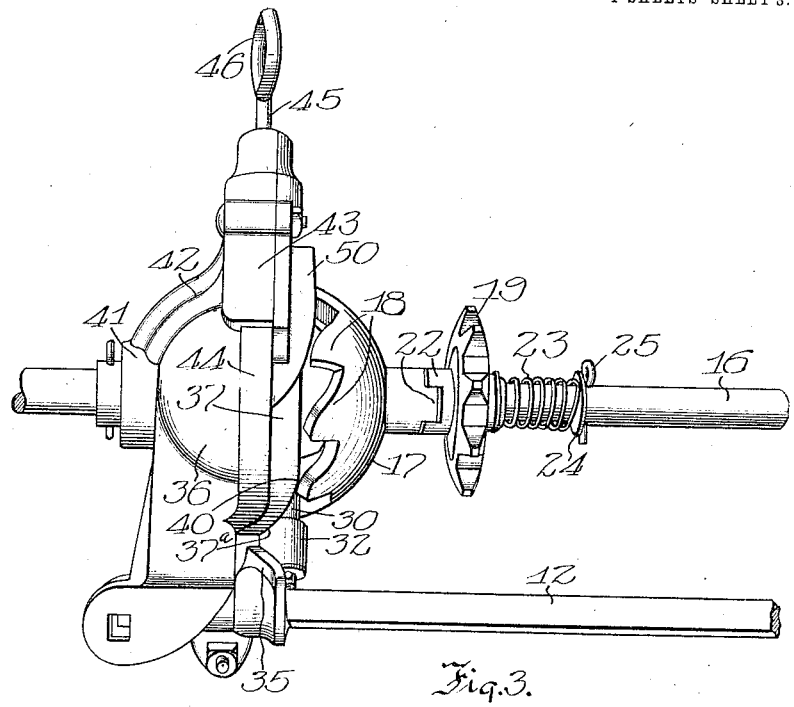
Figure 4:
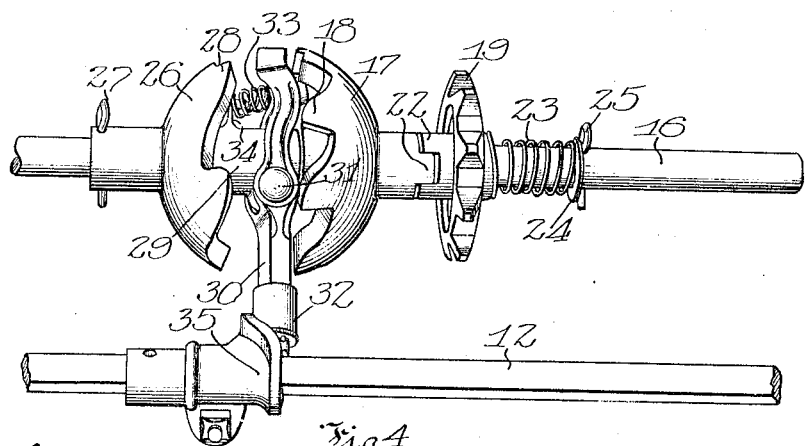

In the drawings;—Figure 1 is a side elevation of a corn planter containing my invention; Fig. 2 is a top or plan view of the same; Fig. 3 is an enlarged detail being a side elevation of the clutch; Fig. 4 is an enlarged detail being a side elevation of the clutch with the casing and movable cam removed so as to show the clutch members and intermediate devices; Fig. 5 is an enlarged detail being a view of the clutch member with the intermediate device shown as moved into position to engage the loose clutch member; Fig. 6 is an enlarged detail being a view of the same parts shown in Fig. 3, partially in vertical section; Fig. 7 is an enlarged detail being a vertical section on line 7—7 of Fig. 2, but showing the intermediate device partially moved around to be engaged by the cam which throws it into engagement with the fixed clutch member; and Fig. 8 is an enlarged detail being a view of the intermediate member or locking dog.

Referring to the drawings:—9 indicates the front frame and 10 the rear frame of the planter. The front frame is provided with the usual check-rower devices including fork levers as 11 on a rock-shaft 12 journaled in the front frame. The rear frame is provided with the usual axle 13 journaled therein and carrying wheels 14 mounted on said axle. The front frame also is provided with the usual seed-boxes 15 which carry seed-plates of any well known pattern and description being provided with cups or seed-cells adapted to contain a single grain of corn.

The seed-plates are not shown as they may be of any well-known form and mounted in any well-known way and form no part of my present invention.

16 indicates a seed-shaft which is journaled in the front frame of the planter and is connected by any suitable gearing in the well-known manner with the seed-plates to actuate the same when the seed-shaft is rotated. As this gearing may be of any well-known character and forms no part of my present invention I have not shown the same as it will be readily understood and to show it would unnecessarily encumber the drawings.

17 indicates a clutch member which is provided on its edge with a plurality of teeth 18 and which is loosely mounted on the seed-shaft 16.

19 indicates a sprocket which is loosely mounted on the seed-shaft 16 and is adapted to be continuously driven by a sprocket-chain 20 running over a sprocket-wheel 21 secured to the axle 13. The sprocket-wheel 19 and clutch member 17 are preferably separate pieces connected together by clutch-teeth 22 as is shown in the drawings, but, of course, may be formed of one piece if desired. The clutch member 17 and sprocket-wheel 19 are yieldingly held in position on the shaft by a spiral spring 23 interposed between the sprocket-wheel 19 and collar 24 held in position by suitable cotter-pin 25.

26 indicates a second clutch member which is fixed in any suitable manner as by a pin 27 to the seed shaft 16 so as to rotate therewith. The clutch member 26 is provided with a plurality of teeth 28. These teeth will be at least one more in number than the greatest number of seed kernels adapted to be dropped at each operation of the check-rower mechanism. For instance, in the form of my device which is shown, it is adapted to drop either two, three or four kernels in each hill and the fixed clutch member 26 is, therefore, provided with five teeth. The purpose of this will be hereinafter described.

29 indicates a sleeve which is journaled on the shaft 16.

30 indicates a lever-dog which is pivoted by a suitable pivot as 31 on the sleeve 29 so as to rock thereon.

32 indicates a roller on one end of the lever-dog 30. The intermediate member or lever-dog 30 is yieldingly held normally out of engagement with the loose clutch member 17 by means of a spring 33 which bears at one end against one arm of the intermediate member and at the other end against a lug 34 carried on sleeve 29.

35 indicates a cam on the check-rower shaft 12 which, when the said shaft is rocked by the operation of the check-rower devices, is adapted to engage the roller 32 and swing it to the right in Figs. 3 and 4 causing it to be engaged by the tooth 18 of the loose clutch member 17 so as to be rotated on the shaft 16 with the rotation of the loose clutch member 17. Figs. 3 and 4 show the intermediate member in normal position. Figs. 5 and 6 show it moved out of normal position so that one arm is engaged with the loose clutch member by the operation of the check-rower shaft.

36 indicates a casing which is suitably mounted upon the front frame and which incloses the fixed clutch member 26. The casing is generally hemispherical in form and carries upon its inner edge preferably formed integral therewith a circular bearing ledge 37 concentric with the seed-shaft 16. The bearing ledge 37 is at such a distance from the center of the shaft as to be in register with a portion of the roller 32 as the member 30 is carried around as hereinafter described, and a portion of this ledge 37, as 38, is raised above the rest of the ledge by slopes 39—40 to such a height that while the roller 32 is passing over the portion 38 the lever is still in engagement with the fixed clutch-member 26 until the slope 40 is reached. The slope 40 slopes downward and ends in a notch 37ª, which is of such a depth that when the roller 32 drops into it by the action of the spring 33 the member 30 is freed from engagement with the lose clutch member 17. The rest of the bearing ledge 37 between the notch 37ª and shoulder 39 is of such a height that when the roller 32 bears upon it the end of the lever on which the roller 32 is carried is in engagement with the teeth of the clutch member 17, but the other arm is not engaged with the fixed clutch member 26.

41 indicates a hub which is journaled on the member 26 and which carries a spider 42.

43 indicates an arc-shaped piece which is preferably formed integral with the spider 42 and which is slidingly mounted on a suitable bearing ledge, as 44, on the casing 36 so that the hub may be turned and the position of the support 43 varied on the casing 36. By means of a suitable pin, as 45, provided with an operating handle, as 46, the arc-shaped piece may be locked in several positions on the casing 36, for the purpose hereinafter described. The pin 45 is spring-seated in the member 43 and is adapted to engage at its lower end with either one of a plurality of notches 47—48—49 in the casing 26. In the form of my mechanism shown these are three in number so that the spider and member 43 may be locked in either one of three positions for the purpose hereinafter described.

50 indicates an arc-shaped cam which is mounted on the member 43, preferably integral therewith, and is formed upon an arc so that when the parts are in position the arc is concentric with the shaft 16. This cam lies parallel with the bearing ledge 37, which is shown in Fig. 7, and is adapted to engage the roller 32 on the intermediate member 30 when the same is carried around by its engagement with the loose clutch member 17 and rock the intermediate member still further into deeper engagement with the teeth on the clutch member 17 and to bring its other arm into engagement with one of the teeth of the clutch member 26 fixed on the shaft 16. It will be obvious from the above that as the cam 50 is moved with the spider 42 into different positions the point in the revolution of the intermediate member at which it will engage the fixed clutch member may be varied. The cam 50 is so positioned that it will always engage the roller, in whatever position the cam is adjusted, before it reaches the raised bearing portion 38, and inasmuch as the raised portion 38 engaging the roller 32 causes the engagement of the lever 30 with the fixed clutch member 26 until the roller passes down the slope 40 of the bearing ledge 37, a different degree of rotation is given to the fixed clutch member, according to the point at which the cam 50 engages the intermediate member 30 so as to move it into position to engage the teeth of the fixed clutch member 26. The cam 50 is of such length as to permit the roller 32 to pass off from it upon the raised portion 38 of the bearing ledge 37, in whatever position the movable cam rests before the roller reaches the down slope 40, and into the notch 37$^a$ at the end of one complete revolution of the clutch member 17.

It will, of course, be understood that the runners of the corn planter as 51 are provided with suitable runner-valves as 52—53—54 by which the grains of corn are accumulated and dropped into the ground in a hill at each operation of the check-rower mechanism. These runner-valves are operated by the check-rower shaft and may be of any well-known form or description. I have simply indicated one form for the purpose of illustration.

The operation of the mechanism above described is as follows:—The spider which is adapted to be operated by the rider from his seat in any well-known way is first set into the desired position according to the number of grains desired to be dropped. As it is usual to drop three grains in each hill I have shown it in the drawings as set in that position, that is, with the pin 45 engaging the middle one 48 of the three notches, the machine being then driven with the usual check-rower wire in engagement with the fork 11. When the fork-lever is operated by the usual button on the check-rower wire the rock-shaft 12 is rocked. The cam 35 on the fork-lever by this rocking of the rock-shaft 12 engaging the roller 30 elevates it out of normal position in the notch or depression 37$^a$. This lifting of the intermediate member causes one end of it, just above the roller 32, to be engaged by one of the teeth 18 of the loose clutch member 17 which, of course, is being continuously rotated. Thus engaged the intermediate member is carried around with the rotation of the loose clutch-member 17. Not being yet in engagement with the teeth of the fixed clutch member 26 the intermediate member passes two of its five teeth. As it revolves with the loose clutch member 17 the roller 32 engages the cam 50 and riding up the slope of the cam is brought into a position to engage the third tooth of the clutch member 26. This causes the clutch member 26 to rotate, carrying around with it the seed-shaft 16 and thereby giving the seed-plate a sufficient degree of rotation to cause three cells to pass under the usual cut-off to be discharged by the runner-valves. Before the rotation is completed, and the intermediate member disengaged from the loose clutch member, it moves off from the cam 50 upon the raised portion 38 of bearing ledge 37 and then down slope 40. This dropping from the raised portion of ledge 37 down the slope 40 frees the end of the lever 30 from engagement with the teeth of the fixed clutch member 26 for a moment, while the other end is still engaged with the teeth 18 of loose cam 17, until the roller drops into notch 37$^a$. This frees the intermediate member from engagement with the loose clutch member until the next operation of the check-rower mechanism. With the next operation of the check-rower mechanism the seed accumulated by the above described operation is dropped in a hill into the ground and the operation is repeated.

If it is desired to drop four grains of corn in the hill, by means of the handle 46 the spider is rocked so as to bring the pin 45 into engagement with the notch 47 carrying the cam 50, of course, with it in a clockwise direction. This will cause the roller 32 to be engaged by the cam sooner than it was engaged at the last described operation and only one tooth of the fixed clutch member 26 will be skipped before the intermediate member engages it and the fixed clutch member and thereby the seed-shaft and seed-plate will be given a greater amount of rotation so as to carry four seed-cells past the usual cut-off. In case it is desired to drop only two grains to the hill, the spider is swung so that the pin 45 is in engagement with the last one 49 of the three notches rocking the spider and with it the cam 40 in a contra-clock-wise direction so that three teeth of the fixed clutch member will be skipped before the intermediate member engages it, thereby giving the fixed clutch member and the seed-shaft and seed-plate a less degree of rotation sufficient to carry two seed-cells under the cut-off. My device is so timed that these operations will be performed in considerably less space of travel of the planter than the distance between two rows,—that is to say, in less time than the time elapsing between the successive impulses of the check-rower wire. For instance, if the knots on the check-rower wire and, consequently, the rows of corn are forty-two inches apart, the parts are so geared that one complete revolution of the loose-clutch member will be made in about twenty-eight inches of travel of the machine. In this twenty-eight inches of travel, supposing my machine to be set to plant three grains of corn in the hill, immediately following the impulse of the check-rower mechanism there will be first a space of time during which the intermediate member is rotated by the loose clutch member but during which the seed-plate will not be rotated. Then follows a space during which the seed-plate will be rotated so as to cause three seed-cells to pass under the cut-off. Then the fixed clutch member will be disengaged from the intermediate member and a short interval or moment of time follows during which the intermediate member will still be engaged by the loose clutch member and travel with it. At the end of the twenty-eight inches of travel, when one revolution of the loose clutch member is completed, the intermediate member drops into the notch out of engagement with the loose member and remains idle during the balance of the forty-two inches of travel until the next operation of the check-rower mechanism. The operation when two or four grains are being planted will be easily understood from the above.

That which I claim as my invention, and desire to secure by Letters Patent, is—

1. In combination, a shaft, a clutch member journaled on said shaft and means for continuously driving the same, a second clutch member fixed on said shaft, an intermediate member journaled on said shaft and normally held yieldingly out of engagement with said clutch members, means for throwing said intermediate member into engagement with said first clutch member at regular intervals, and a cam member adapted to engage said intermediate member after it has been engaged by said first clutch member and move it into engagement with said second clutch member.

2. In combination, a shaft, a clutch member journaled on said shaft and means for continuously driving the same, a second clutch member fixed on said shaft, an intermediate member journaled on said shaft and normally held yieldingly out of engagement with said clutch members, means for throwing said intermediate member into engagement with said first clutch member at regular intervals, a cam member adapted to engage said intermediate member after it has been engaged by said first clutch member and move it into engagement with said second clutch member, and means for automatically releasing said intermediate member from engagement with said first clutch member at the end of a predetermined amount of rotation.

3. In combination, a shaft, a clutch member journaled on said shaft and means for continuously driving the same, a second clutch member fixed on said shaft, an intermediate member journaled on said shaft and normally held yieldingly out of engagement with said clutch members, means for throwing said intermediate member into engagement with said first clutch member at regular intervals, and a cam member adapted to engage said intermediate member after it has been engaged with said first clutch member and bring it into engagement with said second clutch member and also adapted to release said intermediate member from said second clutch member before said intermediate member is released from engagement with said first clutch member.

4. In combination, a shaft, a clutch member journaled on said shaft and means for continuously driving the same, a second clutch member fixed on said shaft, an intermediate member journaled on said shaft and normally held yieldingly out of engagement with said clutch members, means for throwing said intermediate member into engagement with said first clutch member at regular intervals, and an adjustable cam member adapted to engage said intermediate member after it has been engaged by said first clutch member and move it into engagement with said second clutch member.

5. In combination, a shaft, a clutch member journaled on said shaft and means for continuously driving the same, a second clutch member fixed on said shaft, an intermediate member journaled on said shaft and normally held yieldingly out of engagement with said clutch members, means for throwing said intermediate member into engagement with said first clutch member at regular intervals, an adjustable cam member adapted to engage said intermediate member after it has been engaged by said first clutch member and move it into engagement with said second clutch member, and means for automatically releasing said intermediate member from engagement with said first clutch member at the end of a predetermined amount of rotation.

6. In combination, a shaft, a clutch member journaled on said shaft and means for continuously driving the same, a second clutch member fixed on said shaft, an intermediate member journaled on said shaft and normally held yieldingly out of engagement with said clutch members, means for throwing said intermediate member into engagement with said first clutch member at regular intervals, and an adjustable cam member adapted to engage said intermediate member after it has been engaged with said first clutch member and bring it into engagement with said second clutch member and also adapted to release said intermediate member from said second clutch member before said intermediate member is released from engagement with said first clutch member.

7. In a corn planter having check-rower appliances, in combination, a seed-shaft, a toothed clutch member rotatably mounted on said seed-shaft, means for driving said clutch member continuously from the wheels of said planter, a second clutch member fixed to said seed-shaft and having a plurality of teeth greater in number than the largest number of grains desired to be dropped in a hill, a lever-dog journaled on said seed-shaft, means for moving one end of said lever-dog into engagement with a tooth of said first clutch member with each operation of the check-rower mechanism, an adjustable cam adapted to engage said lever-dog after it has been engaged by said first clutch member and move the other end of the same into engagement with said second clutch member, and means for releasing said lever-dog from engagement with said clutch members after a predetermined degree of movement.

8. In a corn planter having check-rower appliances, in combination, a seed-shaft, a toothed clutch member rotatably mounted on said seed-shaft, means for driving said clutch member continuously from the wheels of said planter, a second clutch member secured to said seed-shaft having a plurality of teeth greater in number than the largest number of grains desired to be dropped in a hill, a lever-dog journaled on said seed-shaft, means for moving one end of said lever-dog into engagement with a tooth of said first clutch member with each operation of the check-rower mechanism, an adjustable cam adapted to engage said lever-dog after it has been engaged by said first clutch member and move the other end of the same into engagement with said second clutch member, and means for successively releasing said lever-dog from engagement with said second and said first clutch members after a predetermined degree of movement.

9. In a corn planter having check-rower appliances, in combination, a seed-shaft, a toothed clutch member rotatably mounted on said seed-shaft, means for driving said clutch member continuously from the wheels of said planter, a second clutch member fixed to said seed-shaft and having a plurality of teeth greater in number than the largest number of grains desired to be dropped in a hill, a sleeve journaled on said seed-shaft intermediate said clutch members, a lever-dog pivoted on said sleeve and normally held yieldingly out of engagement with said clutch members, means for moving one end of said lever-dog into engagement with a tooth of said first clutch member at each operation of the check-rower mechanism, an arc-shaped adjustable cam concentric with said clutch members and adapted to engage said lever-dog after the same has been moved into engagement with said first clutch member and to move the same into engagement with said second clutch member, means for adjusting said cam in different positions to vary the period at which said lever-dog is brought into engagement with said second clutch member, and means for successively freeing said lever-dog from engagement with said second clutch member and said first clutch member.

10. In a corn planter having check-rower mechanism, in combination, a seed-shaft, a clutch member loosely mounted on said seed-shaft, a second clutch member secured to said seed-shaft and having a plurality of teeth greater in number than the largest number of grains of corn desired to drop in a hill, a sleeve journaled on said shaft intermediate said clutch members, a lever-dog pivoted on said sleeve, a rock-shaft operated by said check-rower mechanism, a cam on said rock-shaft adapted with each movement of said check-rower mechanism to engage one end of said lever-dog and move the same into engagement with said first clutch member, a circular bearing ridge concentric with said clutch members and having a depression in which one end of said lever-dog normally rests, a spring adapted to yieldingly hold said lever-dog in normal position out of engagement with said clutch-members, an arc-shaped adjustable cam concentric with said clutch members and adapted to engage said lever-dog after the same has engaged with said first clutch member and move the other end of the same into position to engage one of the teeth of said second clutch member and also adapted to release said lever-dog from engagement with said second clutch member before the said lever-dog drops into the depression on said bearing ledge, and means for adjusting said cam in different positions to cause a variation in the time at which said lever-dog will be moved into position to engage said second clutch members.

LAUGHLIN M. BUCHANAN.

Witnesses:
　ALBERT H. ADAMS,
　MINNIE A. HUNTER.